No. 647,448. Patented Apr. 10, 1900.
E. F. ISRAEL.
MACHINE FOR PREPARING SEED FOR PLANTING.
(Application filed May 5, 1899.)
(No Model.)
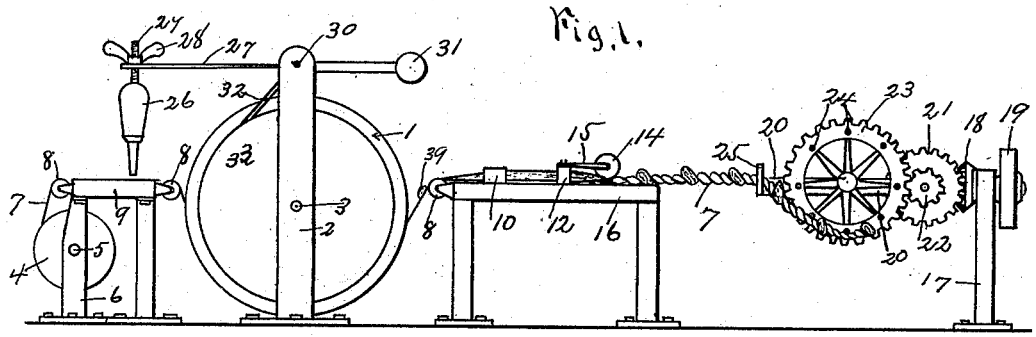
Fig. 1.
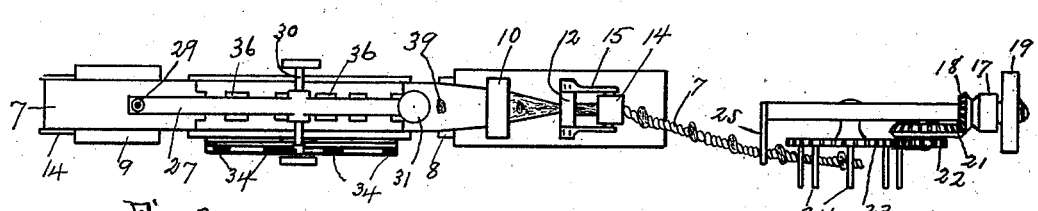
Fig. 2.
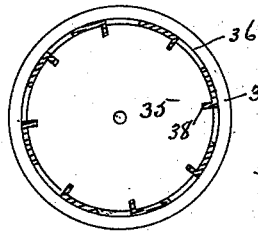
Fig. 3.
Fig. 4.   Fig. 5.
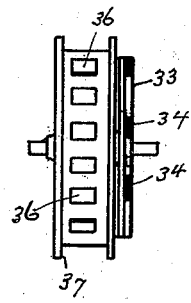
Fig. 6
Fig. 7.
Fig. 8.
Witnesses
B. B. Brown,
L. G. Hagin.
Inventor
Elijah F. Israel
By N. B. Hagin atty.
THE NORRIS PETERS CO., PHOTO-LITHO., WASHINGTON, D. C.

UNITED STATES PATENT OFFICE.

ELIJAH F. ISRAEL, OF WICHITA, KANSAS.

MACHINE FOR PREPARING SEED FOR PLANTING.

SPECIFICATION forming part of Letters Patent No. 647,448, dated April 10, 1900.

Application filed May 5, 1899. Serial No. 715,713. (No model.)

*To all whom it may concern:*

Be it known that I, ELIJAH F. ISRAEL, a citizen of the United States of America, residing at Wichita, in the county of Sedgwick and State of Kansas, have invented certain new and useful Improvements in Machines for Preparing Seeds Ready for Planting, of which the following is a specification, reference being had therein to the accompanying drawings and the figures of reference thereon, forming a part of this specification, in which—

Figure 1 is a side view of my improved machine for preparing seeds for planting. Fig. 2 is a top plan of the same. Fig. 3 is a sectional detail of the seed wheel or hopper. Figs. 4 and 5 are details of said machine. Fig. 6 is an edge view of said seed wheel or hopper. Fig. 7 is a view showing the paper strip, and Fig. 8 is a view showing said paper strip with the seeds before and after being wound in at one end thereof.

This invention relates to certain improvements in a machine for preparing seeds for and the method of planting; and it consists of the novel construction of the machine and method of preparing the seeds; and the object of my invention is to produce a machine for preparing seeds for planting in the manner shown and described.

Referring to the drawings, 1 represents the seed wheel or hopper. 2 represents the supports in which said wheel 1 is journaled at 3. 4 represents a reel journaled at 5 to the supports 6. 7 represents a long strip of narrow tissue-paper wound on said reel 4. 8 represents idler-wheels, over which said paper runs. 9 represents a flat surface over which said paper 7 slides. 10 represents a former having the opening 11, through which said paper passes, raising up the outer edges, forming the strip of paper into a trough shape. 12 represents another former, which is provided with the round opening 13.

14 represents a roller which is yieldingly held by the arms 15 to ride on the paper to prevent said paper from twisting back of said roller. 16 represents a flat surface or platform over which said twisted paper slides.

17 represents a support in which is journaled the shaft 20, near one end. 18 represents a bevel gear-wheel secured stationarily to the frame 17. 19 represents a driving pulley-wheel, which may be a crank or gear wheel keyed to the end of the shaft 20, which is journaled in said support 17. 21 represents a gear-wheel secured to rotate on said shaft 20. 22 represents a small gear-wheel integral with said wheel 21. 23 represents a combined gear-wheel and reel. Said wheel is journaled to said shaft 20 and is provided with pins 24, forming the reel. 25 represents a loop at the free end of said shaft 20.

26 represents a glue-receptacle, which may be filled with any suitable glue or its equivalent. Said glue-receptacle is adjustably secured to the arm 27 through the medium of the thumb-screw 28 and threaded bolt 29. Said arm is journaled to said supports 2 2 at 30. 31 represents a weight on an arm 27, extending out in the opposite direction from said glue-receptacle 26. 32 represents an arm extending down from said arm 27 and comes in contact with the openings which are in the periphery of the wheel 33. Said wheel 33 is keyed to the shaft 3.

35 represents the seed-space inside the wheel 1. 36 represents openings in the periphery of the wheel 1. 37 represents a flange around the periphery of said wheel 1. 38 represents small lugs extending into said seed-space on one side of said openings 36.

39 represents seeds sticking to the strip of paper 7.

This machine is operated in the following manner: A long narrow strip of tissue-paper is wound on the reel 4, placed over the idler-wheels 8, then over the platform 9, under the seed-wheel 1, over the idler 8, through the triangular former 10, through the round former 12, under the roller 14, through the guide-loop 25, and around the reel-pins 24. The seed wheel or hopper is partly filled through the openings 36 with the desired seeds. The glue-receptacle 26 is filled with glue or some equivalent and placed in position. The power is attached to the pulley 19, which when turned will give a revolving motion to the shaft 20, on which said pulley 19 is keyed. Said shaft is journaled in the supporting-post 17. The gear-wheels 21, 22, and 23 are journaled on short shafts which project out from the side of the large shaft 20. The pinion 18 stands stationary and is secured to the supporting-post 17. Said shaft 20 passes centrally through said pinion 18. Said gear-wheels 21, 22, and 23 will turn, together with their shafts, with the shaft 20, and as the wheel 21 is in mesh with the stationary pinion 18, and the pinion 22 is integral with the wheel 21 and in mesh with the reel gear-wheel 23, when said shaft rotates, carrying said wheels 21, 22, and 23 with it, the wheel 21 will rotate on its shaft as it passes around on said stationary pinion 18, thus causing said reel to have said double motion, which double movement will twist the paper, as shown, and wind it on the reel. As the wheel 33 rotates with the seed-wheel 1 the arm 32 will pass over the periphery of the wheel 33, which is provided with one or more holes 34, in which the free end of said arm 32 will drop. Said openings are in the proper location and distance apart to allow the arm to drop at the proper time to bring down the glue from the receptacle 26 to touch the paper strip 7, leaving a drop of glue on said paper. The weight 31 acts as a balance for said glue-receptacle, being somewhat lighter than said receptacle. As the paper passes under the seed wheel or hopper the seed will fall through the holes 36 to the paper 7. One seed will stick to the paper where the drop of glue is, and the balance of the seed will remain in the wheel. As the paper passes up through the formers 10 and 12 the seed will be folded in said strip and wound in said paper, as shown in Figs. 1 and 2. When a strip of the desired length has been wound on the reel 24, it is removed, and a new strip is started on the reel.

Having thus described my invention, what I claim as new and useful, and desire to secure by Letters Patent, is as follows:

1. The herein-described machine consisting of a reel for holding a long strip of paper, a receptacle for holding glue or its equivalent, a receptacle for holding seeds, a mechanism for twisting said strip of paper, and a reel for winding said strip of paper upon when twisted.

2. The herein-described machine for preparing seeds for planting consisting of a reel for holding a long strip of tissue-paper a hollow seed-wheel having one or more openings in its periphery, a receptacle for holding glue or its equivalent adapted to be dropped on said strip of paper at certain intervals, and a mechanism for twisting said strip of paper with the seed therein, and winding the same on a reel.

3. The herein-described machine for preparing seeds for planting, consisting of a reel for holding a long strip of tissue-paper, a receptacle for holding glue or its equivalent adapted to be dropped on said paper at certain intervals, a receptacle for holding seeds to deliver said seeds to said strip of paper on said drop of glue, a reel adapted to be rotated in a double direction for twisting said paper, and gear-wheels for rotating said reel.

4. A single strip of narrow long paper, seeds placed at desired intervals thereon, and said paper twisted around said seeds.

ELIJAH F. ISRAEL.

Witnesses:
THOMAS O. HASS,
W. B. BAILEY.